United States Patent [19]

Moran et al.

[11] 4,083,896
[45] Apr. 11, 1978

[54] TRANSPARENT POLYBLENDS

[75] Inventors: James R. Moran, Hampden; Paul J. Drenzek, Ware, both of Mass.

[73] Assignee: Monsanto Company, St. Louis, Mo.

[21] Appl. No.: 707,785

[22] Filed: Jul. 22, 1976

[51] Int. Cl.$^2$ .................. C08L 51/00; C08L 53/00
[52] U.S. Cl. ............................................. 260/876 R
[58] Field of Search ..................... 260/876 R, 876 B

[56] References Cited

U.S. PATENT DOCUMENTS

| | | | |
|---|---|---|---|
| 3,333,025 | 7/1967 | Bader | 260/876 R |
| 3,725,504 | 4/1973 | Owston | 260/876 R |
| 3,830,889 | 8/1974 | Deets et al. | 260/876 R |
| 3,887,652 | 6/1975 | Carrock et al. | 260/880 R |
| 3,900,528 | 8/1975 | Beer | 260/876 R |
| 3,900,529 | 8/1975 | Beer | 260/876 R |
| 3,903,037 | 9/1975 | Deets | 260/876 R X |
| 3,914,337 | 10/1975 | Giddings et al. | 260/876 R |
| 3,963,807 | 6/1976 | Howe | 260/876 R |
| 3,985,827 | 10/1976 | Hicks | 260/876 R |
| 3,988,392 | 10/1976 | Kameda et al. | 260/876 R |

FOREIGN PATENT DOCUMENTS

| | | | |
|---|---|---|---|
| 556,625 | 4/1958 | Canada | 260/876 R |
| 6,615,290 | 10/1966 | Netherlands | 260/876 R |

*Primary Examiner*—Thomas De Benedictis, Sr.
*Attorney, Agent, or Firm*—Joseph S. Nelson; William J. Farrington; James C. Logomasini

[57] ABSTRACT

The polyblend comprises: (A) a graft copolymer having superstrate copolymers of monovinylidene aromatic and ethylenically unsaturated nitrile monomers and a substrate of a diene rubber dispersed in a matrix phase (B) comprising a blend of about 45 to 75 percent by weight of a (I) copolymer of monovinylidene aromatic and ethylenically unsaturated nitrile monomers and about 25 to 55 percent by weight (II) a methylmethacrylate polymer.

20 Claims, No Drawings

TRANSPARENT POLYBLENDS

BACKGROUND OF THE INVENTION

Polyblends are known in the art as tough engineering plastics having high modulus and great utility for fabricated parts for appliances and automotive parts. ABS polyblends generally comprise a rigid matrix copolymer phase of styrene and acrylonitrile monomers having a graft copolymer of a diene rubber substrate dispersed therein grafted with the styrene/acrylonitrile copolymer. It is known that the graft copolymer is incompatible with the matrix phase and has a different refractive index, hence, the polyblend has a high level of haze providing opaque and translucent polyblends which are generally pigmented as fabricated parts.

There has now been developed a great need for highly transparent polyblends that can be fabricated into transparent parts yet provide the same high level of toughness and modulus typical of ABS polyblends.

The prior art discloses several transparent graft copolymer systems but not for the ABS polyblend types. The transparent graft copolymers disclosed by U.S. Pat. Nos. 2,857,360, 3,177,268, 3,644,584, 3,586,737, 3,670,052 and 3,775,518 teach graft copolymer systems using diene rubber substrate grafted with high levels of acrylate and/or nitrile monomers to provide a graft copolymer with a superstrate refractive index closer to the low refractive index of the diene rubber substrate, hence, providing a transparent graft copolymer for blending with polyvinyl chloride providing transparent polyblends.

It has now been discovered that diene rubber substrates grafted with styrene/acrylonitrile copolymer superstrates only can be blended with a particular matrix phase to produce transparent polyblends having the modulus and toughness of ABS polyblends.

SUMMARY OF THE INVENTION

It has now been discovered that transparent ABS polyblends can be obtained in a composition comprising a polyblend of:

A. a graft copolymer having a graftable rubber substrate containing a diene rubber forming monomer and a superstrate of a copolymer comprising a monovinylidene aromatic monomer and an ethylenically unsaturated nitrile monomer, said graft copolymer having an average rubber particle size diameter of 0.10 to 0.70 microns and a superstrate to substrate ratio of 20 to 100:100, said superstrate copolymer comprising about 73 to 82 percent by weight monovinylidene aromatic monomer and from about 18 to 27 percent by weight of ethylenically unsaturated nitrile monomer, said graft copolymer being dispersed in B. a matrix phase comprising a blend of about 45 to 75 percent by weight of (I) a copolymer of about 73 to 82 percent by weight of monovinylidene aromatic monomer and about 18 to 27 percent by weight of a unsaturated nitrile monomer and about 25 to 55 percent by weight of (II) a methylmethacrylate polymer.

DESCRIPTION OF THE PREFERRED EMBODIMENTS

The Copolymers

The copolymers are styrenic copolymers having a greatest portion of monovinylidene aromatic monomer in their compositions. Such styrenic monomers found useful in the copolymers are styrene; alphaalkyl monovinylidene monoaromatic compounds, e.g., alpha-methylstyrene, alpha-ethylstyrene, alpha-methylvinyl toluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring-substituted halostyrene, e.g., o-chlorostyrene, p-chlorostyrene, o-bromostyrene, 2,4-dichlorostyrene, etc.; ring-alkyl, ring-halosubstituted styrenes, e.g., 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monovinylidene aromatic monomers may be employed. Ethylenically unsaturated nitrile monomers are used as comonomers in smaller proportions. Such nitrile monomers found useful are acrylonitrile, methacrylonitrile, ethacrylonitrile and mixtures thereof.

The matrix phase is a blend of the styrenic copolymers and a polymethyl methacrylate polymer. It has been discovered that polymethyl methacrylate (PMMA) is compatible in all proportions with the SAN copolymers disclosed if the ethylenically unsaturated nitrile monomer content of the copolymer is kept in the range of from about 18 to 27 percent by weight of the copolymer preferably 20 to 24 percent by weight. In the case of styrene and acrylonitrile the two monomers form an azeotrope at a ratio of S/AN of about 76/24, hence, form a compatible copolymer during mass polymerization under reflux since the vapor phase has the same composition as the liquid monomers. However, in the range of 18 to 27 percent acrylonitrile, uniform copolymers can be formed up to about 70 to 100 percent conversion before heterogeneity will occur.

The methylmethacrylate polymer can be polymethylmethacrylate or copolymers of methylmethacrylate with monomers selected from the group consisting of ethyl methacrylate, propyl methacrylate, butyl methacrylate, amyl methacrylate, hexyl methacrylate, acrylonitrile, acrylic acid, ethyl acrylate, butyl acrylate or mixtures thereof. Preferably polymethylmethacrylate is used. Copolymers having at least about 75 percent by weight of methylmethacrylate may be used. The molecular weight of the polymethylmethacrylate polymer can range from 50,000 to 450,000 preferably from about 100,000 to 250,000 as a weight average molecular weight.

The matrix polymers can be prepared by the usual polymerization processes, i.e., by mass, suspension or emulsion polymerization. Such processes are well known. Generally, emulsion polymerization is used to obtain a polymer in emulsion form which can more readily be blended with a graft copolymer latex. However, suspension polymers can be used for a portion or all of the matrix to obtain improved color and clarity of the final polyblend.

The emulsion polymerization utilizes an initial monomer add and a continuous monomer add or late monomer add to insure minimal polymer compositional drift during the reaction. The monomers are fed in amounts to provide about 25-45 percent by weight polymerized polymer in a finished aqueous emulsion.

Exemplary of suitable peroxy catalysts are the alkali peroxides, persulfates, perborates, peracetates and percarbonates, and hydrogen peroxide. If so desired, the catalysts may be activated to form redox systems. In addition, it may be advantageous to include an oil-soluble catalyst such as di-tert-butyl peroxide, benzoyl peroxide, lauroyl peroxide, oleyl peroxide, toluyl peroxide, tert-butyl peracetate, tert-butyl perbenzoate dicumyl peroxide, tert-butyl peroxide, isopropyl peroxy dicarbonate, 3-tert-butyl hydroperoxide, cumene hydroperoxide, p-methane hydroperoxide, cyclopentane hydroperoxide, diisopropylbenzene hydroperoxide, p-tert-butyl-cumene hydroperoxide, pinane hydroperoxide, etc., and mixtures thereof. However, other free-radical generating catalysts may be employed such as actinic radiation.

Chain transfer agents and other polymerization modifiers may be desirably included and it is generally advantageous to incorporate a higher alkyl mercaptan, e.g., dodecyl mercaptan or a terpene such as terpinolene. Generally, modifiers are added in amounts of from 0.01 to 1.0 part per hundred of monomer, preferably in amounts of from about 0.1 to .35 pph of monomer.

The emulsion mixture is then polymerized in an inert atmosphere at temperatures in the range of 20° to 100° centigrade with agitation. Pressures of 1 to 100 pounds per square inch may be employed and the monomers and/or additional catalyst may be added incrementally or continuously over a portion of the reaction cycle. Polymerization is continued until substantially all, i.e., more than 90 percent, of the monomers have reacted. The remaining monomers and other volatile components are then distilled from the latex, which is then dewatered, washed and dried or blended with the graft copolymer latex prior to dewatering, washing and drying as a polyblend.

Polymers of higher clarity and lower color can be prepared by suspension polymerization by conventional procedures. The monomers are suspended in aqueous catalyzed systems, charging proportional amounts of the monovinylidene aromatic ethylenically unsaturated nitrile and acrylate monomers desired in the polymer. As in emulsion polymerization, suspension polymerization uses continuous or late adds of the monomers to adjust the proportions of the monomers in the polymer if the rates of polymerization of the individual monomers are sufficiently different to shift the monomer composition ratios desired in the terpolymer. The major portion of the styrene monomer, which polymerizes more rapidly than the other monomers, is added continuously during the polymerization to insure polymer uniformity as to composition. Such suspension processes are described in the publication of C. E. Schildknecht, "Polymer Processes", Interscience Publishers, New York, N.Y., 1956.

The Rubber Substrate

The preferred rubbers are diene rubbers or mixtures of diene rubbers, i.e., any rubber polymers (a polymer having a second order transition temperature not higher than 0° centigrade, preferably not higher than −20° centigrade, as determined by ASTM Test D-746-52T) of one or more conjugated 1,3-dienes, e.g., butadiene, isoprene, piperylene, chloroprene, etc. Such rubbers include homopolymers of conjugated 1,3-dienes and interpolymers of such 1,3-dienes with up to an equal amount by weight of one or more copolymerizable monoethylenically unsaturated monomers, such as monovinylidene aromatic hydrocarbons (e.g., styrene, an aralkylstyrene, such as the o-, m-, and p-methylstyrenes, 2,4-dimethylstyrene, the ar-ethylstyrenes, p-tert-butyl-styrene, etc.; an alpha-alkylstyrene, such as alpha-methylstyrene, alpha-ethylstyrene, alpha-methyl-p-methylstyrene, etc.; vinyl naphthalene, etc.); ar-halo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinylmethyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a crosslinking agent, based on the weight of the rubber-forming monomer or monomers, crosslinking may present problems in dissolving the rubber in the monomers for the graft polymerization reaction. In addition, excessive crosslinking can result in loss of the rubbery characteristics. The crosslinking agent can be any of the agents conventionally employed for crosslinking diene rubbers, e.g., divinylbenzene, diallyl maleate, diallyl fumarate, diallyl adipate, allyl acrylate, allyl methacrylate diacrylates and dimethacrylates of polyhydric alcohols, e.g., ethylene glycol dimethacrylate, etc.

A preferred group of rubbers are those consisting essentially of 70 to 100 percent by weight of butadiene and/or isoprene and up to 30 percent by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene.

Of the various techniques customarily employed for polymerizing rubber monomers including mass, suspension and emulsion polymerization, emulsion polymerization is preferred since it will provide the particle size for which the present invention is most beneficially employed and may be used to produce a latex which is useful as the base for emulsion polymerization of the graft copolymer.

Graft Copolymerization Process

The graft copolymers are prepared by polymerizing monovinylidene aromatic monomers and the ethylenically unsaturated nitrile monomers in the presence of the preformed rubber substrate, generally in accordance with conventional graft polymerization techniques. Although suspension and mass polymerization techniques may be employed, the preferred processes use an emulsion technique to obtain the particle size of not more than about 0.7 micron for the graft copolymer with which the present invention is most beneficially employed. In such graft polymerization, the preformed rubber substrate is contained in a latex with dispersed monomers and this admixture is polymerized to combine chemically or graft at least a portion of the interpolymer upon the rubber substrate. Depending upon the ratio of monomers to rubber substrate and polymerization conditions, it is possible to produce the desired degree of grafting of the copolymer onto the rubber substrate. The grafting mixed comonomers are grafted to the substrate in a ratio of monovinylidene aromatic monomers to ethylenically unsaturated monomers of about 73:27, to 82:18 providing, e.g. styrene/acrylonitrile graft copolymers having from about 73 to 82 weight percent of styrene and 18 to 27 weight percent of acrylonitrile.

As will be pointed out, more in detail hereinafter, the ratio of monomers to rubber charged to the graft polymerization reaction is the primary determinant of the superstrate:substrate ratio of the resultant graft copolymer. However, conditions of polymerization, rubber chemistry and particle size, rates of monomer addition, chain transfer agents, etc., may also exert an effect.

The catalyst is generally included within the range of 0.001 to 1.0 percent by weight, and preferably on the order of 0.05 to 0.8 percent by weight of the polymerizable material, depending upon the monomers and the desired polymerization cycle.

As is well known, it is often desirable to incorporate molecular weight regulators such as mercaptans, halides and terpenes in relatively small percentages by weight, on the order of 0.001 to 2.5 percent by weight of the polymerizable material. In addition, it may be desirable to include relatively small amounts of antioxidants or stabilizers such as the conventional alkylated phenols, although these may be added during or after polymerization.

In the emulsion polymerization process, the monomers and rubber substrate are emulsified in water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven particularly advantageous are sodium oleate, sodium palmitate, sodium stearate and other sodium soaps. Generally, the emulsifying agent is provided in amounts of about 0.1 to 15 parts by weight per 100 parts by weight of the monomers, and water is provided in an amount of about 1 to 4 parts per part of monomers, and even in larger ratios where greater dilution is desirable.

If so desired, an aqueous latex formed in the emulsion polymerization of the rubber substrate may provide the aqueous medium into which the monomers are incorporated with or without additional emulsifying agents, water, etc. However, the rubber may be dissolved in the monomers and the mixture emulsified, or a latex thereof may be separately prepared.

Various water-soluble free radical polymerization initiators are conventionally used for emulsion polymerization of the rubber monomer including conventional peroxy and azo catalysts, and the resultant latex may be used as the aqueous medium with which the copolymer monomers are admixed. In this manner, the catalyst for the rubber polymerization may function in whole or in part as the catalyst for the graft polymerization. However, additional catalyst may be added at the time of graft polymerization. Suitable peroxy catalysts have been disclosed hereinbefore and may be used in graft copolymerization process.

Chain transfer agents and other polymerization modifiers may be desirably included and it is generally advantageous to incorporate a higher alkyl mercaptan such as tert-dedecyl mercaptan, which acts both as a promoter and a regulator. In addition, antioxidants and stabilizers such as the alkylated phenols may be added.

The emulsion mixture is then polymerized in an inert atmosphere at temperatures in the range of 20° to 100° centigrade with agitation. Pressures of 1 to 100 pounds per square inch may be employed and the monomers and/or additional catalyst may be added incrementally or continuously over a portion of the reaction cycle. Polymerization is continued until substantially all, i.e., more than 90 percent, of the monomers have reacted. The remaining monomers and other volatile components are then distilled from the latex, which is then dewatered, washed and dried.

The base particle size of the emulsion graft particles may be varied by seeding, emulsifying agent concentration, agitation, rubber size variation through agglomeration prior to grafting, coagulation techniques, etc. One of the most advantageous means for achieving the desired particle size rubber substrate is by controlled agglomeration using acidulation techniques as taught in U.S. Pat. No. 3,551,370 to W. O. Dalton.

Effect of Particle Size

Generally, the particle size of the rubber in the emulsion during the graft polymerization reactions has an effect upon the optimum grafting level for the graft copolymer. As will be readily appreciated, a given weight percentage of smaller size rubber particles will provide considerably greater surface area for grafting than the equivalent weight of a larger size rubber particle. Accordingly, the density of grafting will be varied depending upon the size of the rubber particle. Generally, the smaller rubber particles will tolerate a higher superstrate/substrate ratio than the larger size particles to give generally comparable results.

The weight of superstrate is determined for 100 grams of the graft copolymer by solvent extracting the ungrafted matrix from a polymerization blend and subtracting the weight of rubber charge.

The particle size of the rubber graft copolymer in the polyblend also has a significant effect upon the gloss and transparency properties; i.e., increasing the particle size of the graft copolymer tends to adversely affect these properties. Moreover, if the particles are in excess of about 0.7 micron, the benefits of the present invention are materially reduced. Accordingly, the particle size of the graft copolymers may be varied from as little as 0.03 micron to as much as about 0.7 micron, depending upon the ultimate properties of the composition. However, the preferred latices utilize rubbers having a particle size of about 0.05 to 0.5 micron, and desirably 0.08 to 0.3.

The particle size is a weight average particle size diameter expressed in microns. The weight average particle size is measured with a photosedimentometer by the published procedure of Graves, M. J. et.al., "Size Analysis of Subsieve Powders Using a Centrifugal Photosedimentometer", British Chemical Engineering 9:742-744 (1964). A Model 3000 Particle Size Analyzer from Martin Sweets Company, 3131 W. Market St., Louisville, Ky. was used.

Although the amount of copolymer superstrate grafted onto the rubber substrate may vary from as little as 10 parts by weight per 100 parts of substrate to as much as 250 parts per 100 parts, the preferred graft copolymers have a superstrate-substrate ratio of about 20 to 100:100 most preferably 30 to 60:100. The copolymer grafted has a ratio of monovinylidene aromatic monomer to ethylenically unsaturated monomer, e.g., styrene to acrylonitrile of from about 73 to 27, to 82 to 18.

Polyblends

The graft copolymers may be blended with the ungrafted matrix polymers as latices followed by coagulation, washing and drying. The dried latex blend may be further dry blended with the suspension matrix polymer and melt colloided by extrusion, milling or by banbury at temperatures of 150° to 250° C., dispersing the graft copolymer in the matrix polymer to form the polyblend. Such blending processes are well known in the art.

During the formation of the polyblend, under melt colloiding conditions at about 150° to 250° C., the grafted copolymers have been found to cluster providing stable clustered particles that are stable to the shear of extrusion and molding operations. The clustered particles have a weight average particle size diameter of from about 0.10 to 0.7 microns, preferably from about 0.3 to 0.6 microns in their clustered state providing transparency and desirable toughness and gloss properties for the polyblend.

Generally, the blends will contain from about 1 to 70 parts by weight of the graft copolymer preferable 5 to 45 percent by weight, most preferably from about 10 to 30 percent by weight. Such proportions of graft copolymer provide the polyblend with from about 2 to 35 percent by weight of the diene rubber moiety, preferably 5 to 25 percent, providing toughening for the polyblend.

The following examples are presented as illustrations of the preparation and utility of the present ABS compositions providing transparent polyblends. The examples are not intended in any way to limit the spirit and scope of the invention.

EXAMPLE 1

Part A

Prepare a rubbery latex from the following polymerization recipe.

| Component: | Parts |
|---|---|
| Water | 265 |
| Butadiene | 90 |
| Styrene | 10 |
| Divinylbenzene* | 0.625 |
| Sodium stearate | 6 |
| t-Dodecyl mercaptan | 0.4 |
| Potassium persulfate | 0.3 |

*added at 45% conversion

Charge the water and sodium stearate to a suitable, agitated reaction vessel. Boil to remove dissolved oxygen, and cool under nitrogen. Add the remaining components of the polymerization recipe. Heat at about 55° C. under agitation conditions of a net horsepower of about 0.0002 HP/gallon of reaction mixture to the stage of about 95 percent conversion to polymer.

Part B

Add about 0.15 part of potassium persulfate to the rubber latex of Part A. Then add about 50 parts of an 76/24 mixture of styrene and acrylonitrile with agitation over a period of about 3 hours, maintaining the temperature at 55° C. throughout the addition and for about 1 hour thereafter. Strip the resultant graft copolymer latex of unreacted monomers. The latex was stabilized with antioxidant and coagulated with $Al_2(SO_4)_3$, filtered, washed and dried as a grafted rubber crumb. The crumb on analysis had about 45 percent graft SAN copolymer (76/24) and molded test samples had a R.I. of about 1.5390. About 20 parts of the crumb were dry blended with 80 parts of a matrix blend comprising 58 percent by weight of a SAN copolymer (76/24) and 42 percent by weight of PMMA polymer giving a polyblend of about 20 percent graft rubber having a rubber moiety of about 14 percent. The matrix blend alone was found to have a R.I. of about 1.5385 matching the grafted rubber blend. The dry blend was melt colloided by extrusion at 230° C. and molded into polyblend specimens for haze measurements by ASTM D-1003-66 test. The haze value of the polyblend was found to be about 6.50 as compared to a molded ABS (acrylonitrile/butadiene/styrene) polyblend having a haze value of about 100. The impact strength of the present polyblend was found to be 2.5 ft.lbs./in. (137 cm gm/cm) by ASTM D-256-56 test considered high for such polyblends having about 14 percent rubber.

Such polyblends are easily formulated based on the weight percent of rubber needed in the polyblend and the percent by weight of SAN grafted to the rubber to optimize the physical properties. The refractive indices of butadiene, acrylonitrile, styrene and methylmethacrylate polymers are 1.515, 1.515, 1.591 and 1.491 respectively. The refractive index of any diene rubber can be calculated based on the refractive indices of the comonomers, e.g.:

Butadiene/styrene (90/10):

$(1.515 \times 90) + (1.591 \times 10) \div 10$ or 1.523
Polybutadiene $(1.515 \times 100) \div 100$ or 1.515

Butadiene/styrene (70:30)

$(1.515 \times 70) + (1.591 \times 30) \div 100$ or 1.538

The refractive index of SAN graft and matrix polymers can be calculated, e.g., S/AN of 76/24 has a R.I. of $(1.591 \times 76) + (1.515 \times 24) \div 100$ or 1.573.

The refractive index of the graft copolymer can be calculated having 45 percent by weight of S/AN 76/24 grafted to rubber. Rubber Index (B/S - 90/10) at 100 parts and Graft S/AN (76/24) at 45 parts calculated to a R.I. of $(1.523 \times 100) + (1.573 \times 45) \div 145 = 1.5390$. The graft copolymer has a R.I. of 1.5390 and must be matched within ± 0.005, preferably ± 0.003 units by the matrix phase to give the resulting polyblend high clarity and whiteness of color.

In the above example, the matrix phase must have about the same R.I. as the grafted rubber phase. The 80 percent by weight of matrix phase must be a blend of SAN and PMMA that matches the graft rubber phase having an R.I. of about 1.5390. A blend of about 42 percent of PMMA and 58 percent of SAN (76/24) was found to have a R.I. about 1.5385 matching the graft copolymer closely, giving a low haze polyblend. The refractive index was determined by an Abbe Refractometer with bromonapthalene as the immersion fluid using ASTM D-2225 at 25° C. The haze values were determined by:

$$\% \text{ Haze}^* = \frac{Tb}{Tw} \times 100$$

*(at 420, 500 and 530 mμ and averaged)
ASTM 1003.

EXAMPLE 2

The procedures of Example 1 were repeated using a polybutadiene rubber grafted with 45 percent of SAN copolymer (76/24) with said grafted rubber copolymer found to have a R.I. of about 1.5300. About 20 parts of the graft copolymer were blended with 80 parts of a matrix blend about 47.5 percent by weight of SAN copolymer (76/24) and 52.5 percent by weight of PMMA. The matrix blend had a measured R.I. of about 1.5300. The polyblend was melt colloided by extrusion at 230° C. and tested for haze. The value was found to be 7.0. The impact strength of the polyblend was 2.7 ft.lbs./in. (13.6 cm gm/cm).

EXAMPLE 3

The procedures of Example 1 were repeated using a diene rubber of 70 percent butadiene and 30 percent styrene grafted with 45 percent of S/AN (76/24) giving a grafted rubber having a R.I. of 1.5430. About 20 parts of the graft copolymer were blended with 80 parts of matrix blend of about 70.5 percent by weight of SAN copolymer (76/24) and 29.5 percent by weight of PMMA polymer. The matrix blend was found to have a R.I. of about 1.5430 and the polyblend a haze value of about 6.9 providing a clear highly transparent polyblend.

EXAMPLE 4

The procedures of Example 1 were repeated using a diene rubber of 95 percent butadiene and 5 percent acrylonitrile grafted to about 45 percent with S/AN (76/24) giving a graft copolymer having an R.I. of about 1.5300 which is the same as polybutadiene graft copolymer since the acrylonitrile has the same R.I. as butadiene. About 20 parts of the graft copolymer was blended with 80 parts of a matrix blend of 47.5 percent by weight of SAN copolymer (76/24) and 52.5 percent by weighyt of PMMA. The matrix phase had a R.I. of 1.5300 and the polyblend a haze value of about 6.9. The impact strength of the polyblend was 2.5 ft/lbs/in. (13.7 cm gm/cm).

EXAMPLES 5 – 8

The procedures of Example 1 were repeated to prepare a graft copolymer having about 45 percent graft and having a R.I. of about 1.539. Matrix blends of SAN (76/24) copolymer and PMMA were prepared of various weight percent proportions to determine the haze values of the polyblends versus shift in the R.I. of the matrix blend. About 20 parts of the graft copolymer was melt blended with 80 parts of the matrix phase in each case.

| Ex. | Matrix (% wgt.) Proportions SAN | PMMA | R.I. of Matrix | R.I. of Graft Rubber | Haze |
| --- | --- | --- | --- | --- | --- |
| 5 | 58 | 42 | 1.539 | 1.539 | 6.0 |
| 6 | 60 | 40 | 1.540 | 1.539 | 8.0 |
| 7 | 55 | 45 | 1.536 | 1.539 | 12.0 |
| 8 | 50 | 50 | 1.532 | 1.539 | 20.0 |

The data indicates that for a difference of 0.002 units in refractive index between the rubber graft phase and the matrix phase that the haze will increase by 1 unit. It has also been noted that the color of the polyblend will shift with differences in the refractive index of the matrix versus the graft rubber phase. If the refractive index of the graft phase is higher than the matrix the polyblend appears bluer whereas if the refractive index of the graft phase is lower the color will shift to yellow. This shift in color is visible to the eye and can be measured by spectrophotometric means. Hence, if the polyblend appears yellow then small amounts of PMMA must be added to bring the R.I. of the matrix phase down and shift it to the blue or colorless side giving one a method of optimizing polyblend haze levels in compounding operations.

The present process then provides a method of preparing transparent ABS type polyblends having a diene rubber grafted with SAN polymer and a matrix phase comprising a SAN copolymer blended with sufficient polymethyl methacrylate polymer to cause the matrix phase to match the graft rubber phase sufficiently close to provide a transparent polyblend. As disclosed in Example 1 the refractive index of any ABS graft rubber copolymer can be determined and matched with a matrix phase of SAN copolymer and a methlmethacrylate polymer by simple mechanical blending procedures providing a simple direct route to clear ABS type polyblends by the addition of sufficient methyl methacrylate copolymer to the ABS polyblend to provide a matrix phase that matches the graft rubber phase.

For example, if a ABS polyblend of 20 percent rubber is desired, having 50 percent SAN graft, one polymerized the rubber and grafts with 50 percent SAN polymer of proportions 73/27 to 82/18. One then has a graft copolymer of 30 parts which is blended with 70 parts of a matrix phase. Knowing the R.I. of the graft rubber phase one formulates 70 parts of the matrix phase of SAN copolymer and PMMA polymer to match the rubber graft phase, knowing the refractive index of the SAN copolymer and the PMMA polymer.

What is claimed is:

1. A transparent polyblend composition having:
    A. a graft copolymer having a graftable rubber substrate containing a diene rubber forming monomer and a superstrate of a copolymer consisting essentially of a monovinylidene aromatic monomer and an ethylenically unsaturated nitrile monomer, said graft copolymer having an average clustered particle size diameter of 0.10 to 0.70 microns and a superstrate to substrate ratio of 20 to 100:100, said superstrate copolymer consisting essentially of about 70 to 82 percent by weight monovinylidene aromatic monomer and from about 18 to 30 percent by weight of ethylenically unsaturated nitrile monomer, said graft copolymer being dispersed in
    B. a matrix phase consisting essentially of a blend of about 45 to 75 percent by weight of (I) a copolymer of about 70 to 82 percent by weight of monovinylidene aromatic monomer and about 18 to 30 percent by weight of a unsaturated nitrile monomer and about 25 to 55 percent by weight of (II) a methylmethacrylate polymer.

2. A composition of claim 1, wherein said monovinylidiene aromatic monomer is styrene and said ethylenically unsaturated nitrile is acrylonitrile.

3. A composition of claim 1, wherein the rubber substrate comprises at least about 70 percent by weight of a 1,3 conjugated diene monomer and from about 0 to 30 percent by weight of a monovinylidene aromatic monomer.

4. A composition of claim 3, wherein said diene monomer is butadiene and said monovinylidene aromatic monomer is styrene.

5. A composition of claim 1, wherein said rubber substrate comprises at least about 70 percent by weight of a 1,3 butadiene conjugated diene monomer and from 1 to 30 percent by weight of an ethylenically unsaturated nitrile monomer.

6. A composition of claim 5, wherein said diene monomer is butadiene and said nitrile monomer is acrylonitrile.

7. A composition of claim 1, wherein the refractive index of matrix phase (B) matches that of the graft copolymer phase (A) such that the polyblend is transparent.

8. A composition of claim 1, wherein the rubber moiety of said graft copolymer (A) is present in said polyblend in amounts of from about 2 to 35 percent by weight of said polyblend.

9. A composition of claim 1, wherein said methylmethacrylate polymer is a copolymer of methylmethacrylate and a comonomer selection from the group consisting of ethyl methacrylate, propyl methacrylate, butyl methacrylate, amyl methacrylate and hexyl methacrylate or mixtures thereof.

10. A process for preparing transparent polyblends comprising dry blending
  A. a graft copolymer having a graftable rubber substrate containing a diene rubber forming monomer and a superstrate of a copolymer comprising a monovinylidiene aromatic monomer and an ethylenically unsaturated nitrile monomer, said graft copolymer having an average clustered particle size diameter of 0.10 to 0.70 microns and a superstrate to substrate ratio of 20 to 100:100, said superstrate copolymer comprising about 73 to 82 percent by weight monovinylidene aromatic monomer and from about 18 to 27 percent by weight of ethylenically unsaturated nitrile monomer, with
  B. a matrix phase comprising a blend of about 45 to 75 percent by weight of (I) a copolymer of about 73 to 82 percent by weight of monovinylidene aromatic monomer and about 18 to 27 percent by weight of a unsaturated nitrile monomer and about 25 to 55 percent by weight of (II) a methylmethacrylate polymer followed by melt colloiding the dry blend of (A) and (B) at temperatures of from about 150° to 250° C. forming a uniform polyblend.

11. A process of claim 10, wherein said monovinylidiene aromatic monomer is styrene and said ethylenically unsaturated nitrile is acrylonitrile.

12. A process of claim 10, wherein the rubber substrate comprises at least about 70 percent by weight of a 1,3 conjugated diene monomer and from about 0 to 30 percent by weight of a monovinylidene aromatic monomer.

13. A process of claim 10, wherein said diene monomer is butadiene and said monovinylidene aromatic monomer is styrene.

14. A process of claim 10, wherein said rubber substrate comprises at least about 70 percent by weight of a 1,3 butadiene conjugated diene monomer and from 1 to 30 percent by weight of an ethylenically unsaturated nitrile monomer.

15. A process of claim 10, wherein said diene monomer is butadiene and said nitrile monomer is acrylonitrile.

16. A process of claim 10, wherein the rubber moiety of said graft copolymer (A) is present in said polyblend in amounts of from about 2 to 35 percent by weight of said polyblend.

17. A process of claim 10, wherein said methylmethacrylate polymer is a copolymer of methmethacrylate and a comonomer selected from the group consisting of ethyl methyacrylate, propyl methacrylate, butyl methacrylate, amyl methacrylate and hexyl methacrylate or mixtures thereof.

18. A process of claim 10, wherein the refractive index of the matrix phase (B) matches that of the graft copolymer (A) such that the polyblend is transparent.

19. A process of claim 10, wherein said methylmethacrylate polymer is a polymethylmethacrylate homopolymer.

20. A composition of claim 1, wherein said methlmethacrylate polymer is a polymethylmethacrylate homopolymer.

* * * * *